Sept. 13, 1938.                T. E. M. WHEAT                    2,129,804
                                MOTOR VEHICLE
                            Filed June 19, 1935              5 Sheets-Sheet 1
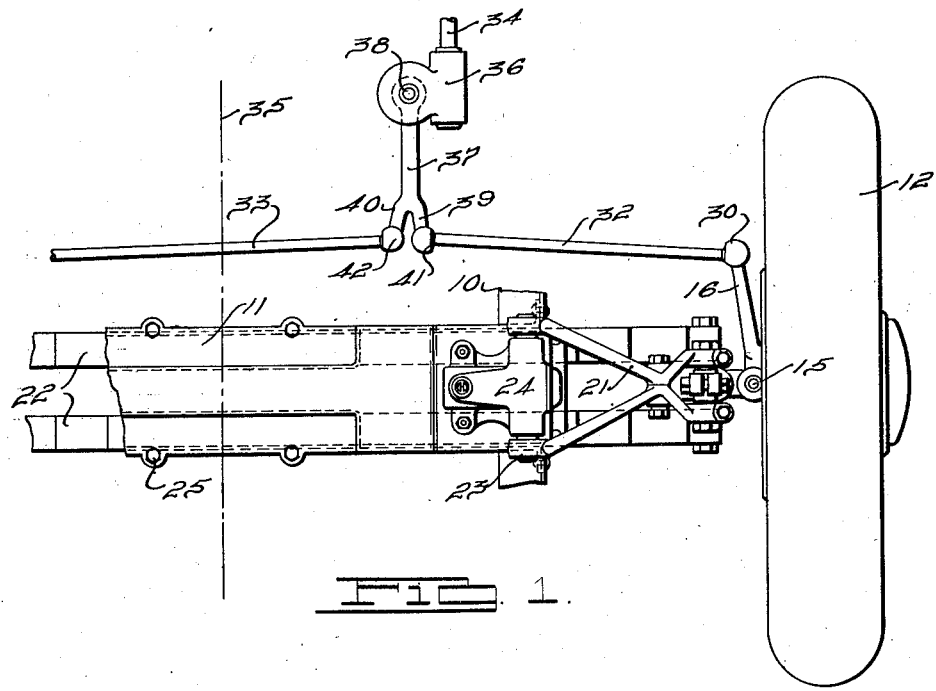
FIG. 1.
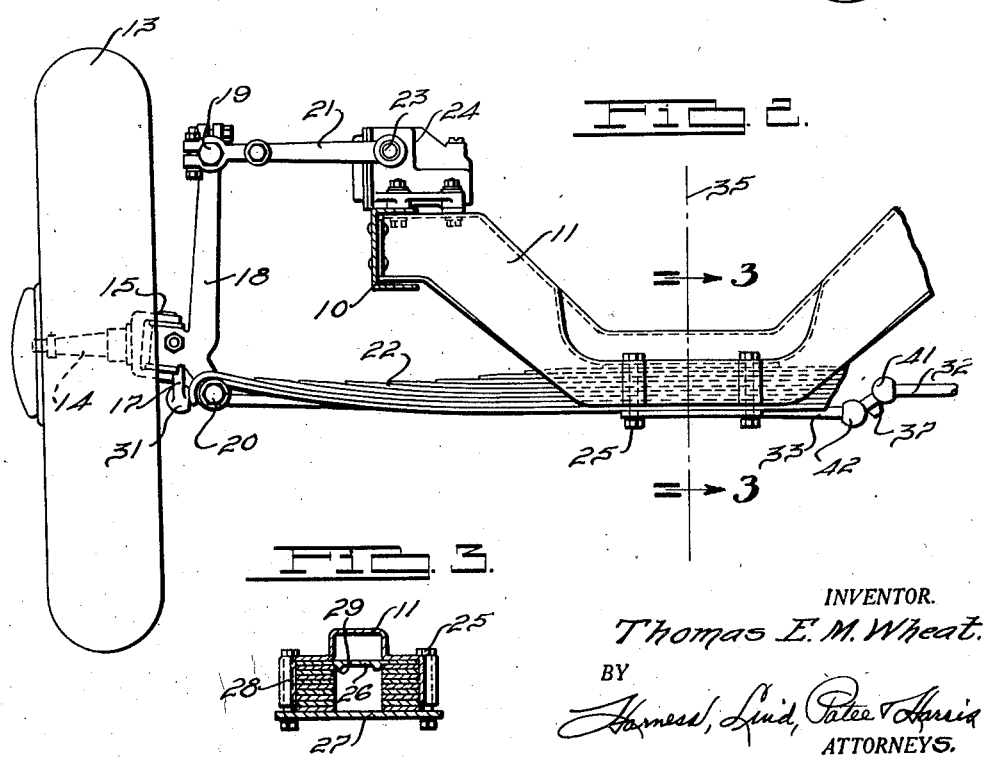
FIG. 2.
FIG. 3.
INVENTOR.
Thomas E. M. Wheat.
BY
Harness, Dind, Patee & Harris
ATTORNEYS.

Sept. 13, 1938. T. E. M. WHEAT 2,129,804
MOTOR VEHICLE
Filed June 19, 1935 5 Sheets-Sheet 2
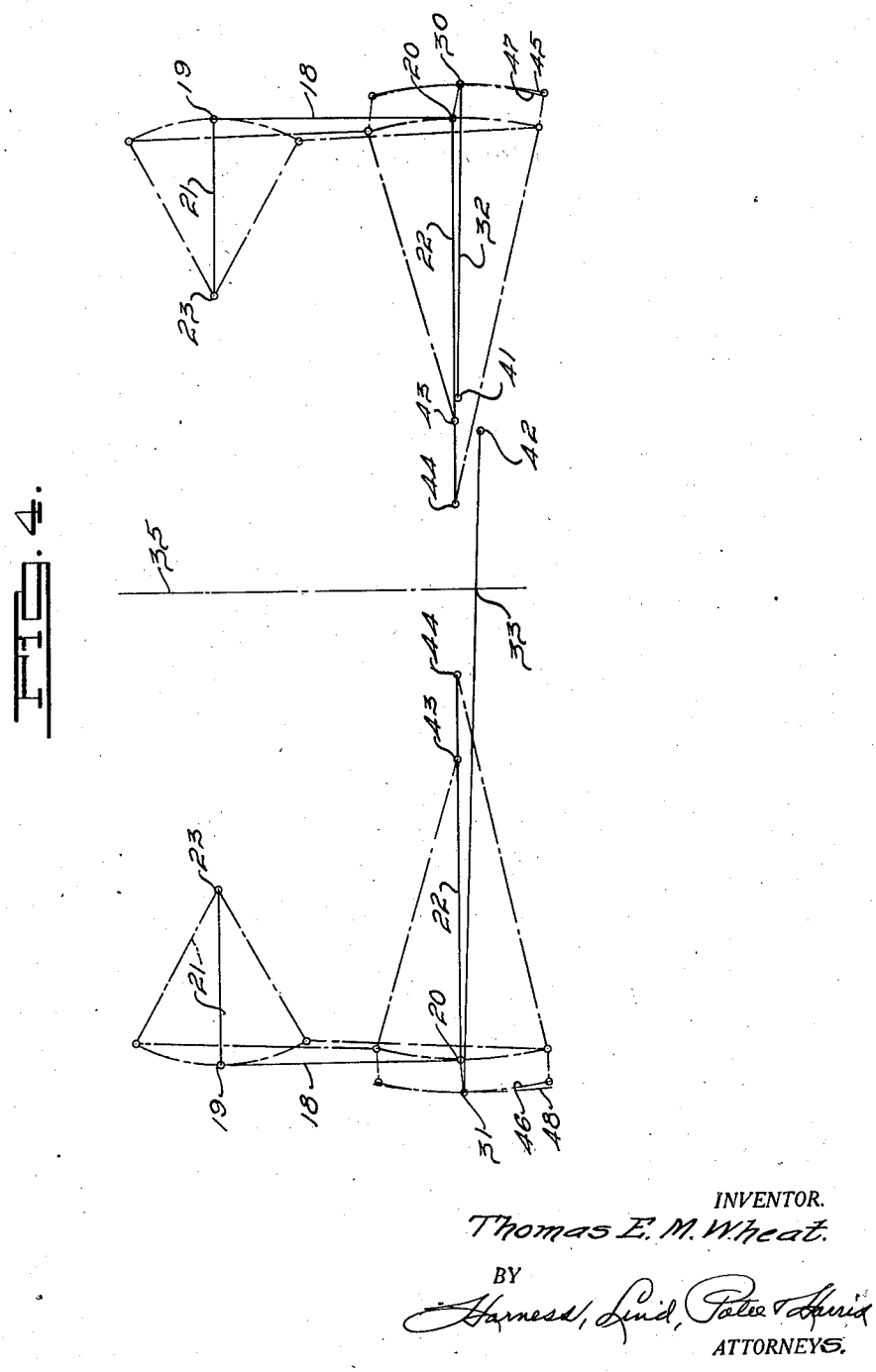
INVENTOR.
Thomas E. M. Wheat.
BY
ATTORNEYS.

Sept. 13, 1938.  T. E. M. WHEAT  2,129,804
MOTOR VEHICLE
Filed June 19, 1935    5 Sheets-Sheet 3
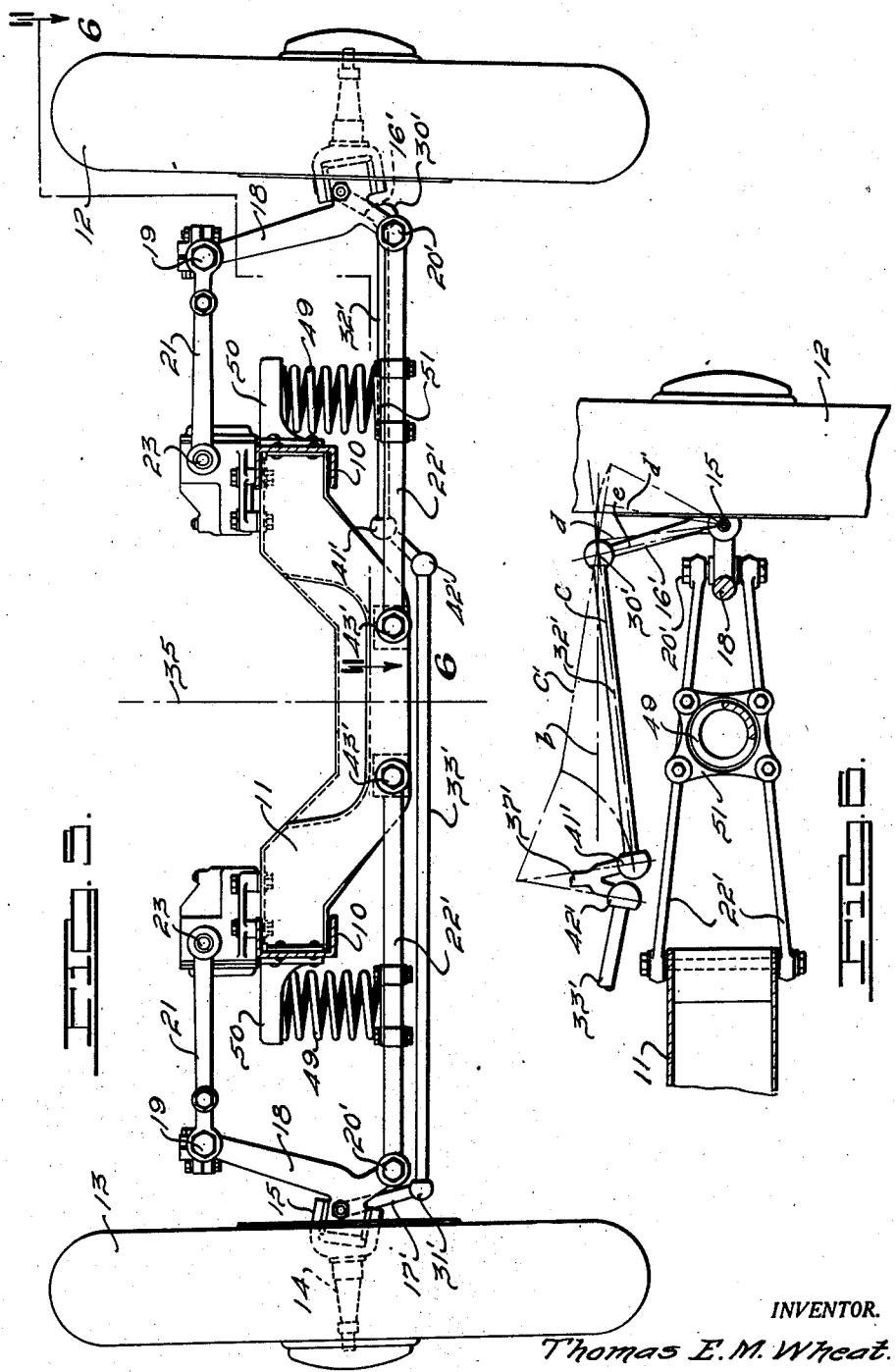

INVENTOR.
Thomas E. M. Wheat.
BY
ATTORNEYS.

Sept. 13, 1938.  T. E. M. WHEAT  2,129,804
MOTOR VEHICLE
Filed June 19, 1935   5 Sheets-Sheet 5

INVENTOR.
Thomas E. M. Wheat.
BY
ATTORNEYS.

Patented Sept. 13, 1938

2,129,804

UNITED STATES PATENT OFFICE 2,129,804

MOTOR VEHICLE

Thomas E. M. Wheat, Highland Park, Mich., assignor to Chrysler Corporation, Highland Park, Mich., a corporation of Delaware Application June 19, 1935, Serial No. 27,287

24 Claims. (Cl. 280—95)

This invention relates to motor vehicles and refers more particularly to improvements in motor vehicles having independently sprung steering ground wheels.

One object of my invention is to provide improved steering mechanism for independently sprung ground wheels.

A further object is to provide a relatively simple steering mechanism in conjunction with an independent wheel suspension wherein the steering mechanism is less costly to manufacture than steering mechanisms used heretofore.

Another object of my invention is to provide improvements in steering mechanisms for independently sprung wheels which will lessen wheel tire wear, eliminate undesirable steering wheel rotation or "wheel fight", provide and maintain greater accuracy in the steering geometry especially as the wheels rise and fall as well as when the steering mechanism is operated to steer the vehicle.

It has been heretofore proposed to articulate the tie rods directly between the wheel knuckle steering arms and the steering gear arm or pitman arm of the reduction gear mechanism but since the reduction gear mechanism is usually located to one side of the vehicle difficulties have arisen, especially in connection with independently sprung wheel systems as well as in the more conventional axle-connected types of front wheel suspensions, owing principally to the difference in length of the tie rods. This inherent characteristic renders it impossible to prevent an undesired steering movement to be imparted to the wheels as they rise and fall resulting in excessive tire wear, "wheel fight," vibration of the motor vehicle and generally undesirable steering geometry.

My invention provides a simple and effective remedy for the foregoing difficulties and disadvantages and may be realized without the addition of complications or added mechanism and cost. In carrying out my invention in its preferred embodiment, the pitman arm is constructed to provide tie rod ball pivots at different elevations, preferably by forking the swinging end of the pitman arm, the steering knuckle arm ball pivots being located in conjunction with the pitman arm ball pivots to compensate for the objectionable characteristics otherwise inherent in the system.

As a further feature of my invention the ball points may be also longitudinally spaced when viewed in plan to describe differing arcs of travel whereby to provide improved steering differential of the steering wheels.

Another feature of my invention resides in the provision of means for maintaining the desired relative toe-in position of the steering wheels during steering, especially in conjunction with an independent wheel suspension system of the character aforesaid.

Further objects and advantages of my invention will be more apparent from the following illustrative embodiments thereof, reference being had to the accompanying drawings in which:

Fig. 1 is a top plan view of the forward right portion of a motor vehicle chassis showing my invention applied thereto.

Fig. 2 is a front elevational view of the Fig. 1 chassis but illustrating the forward left portion thereof.

Fig. 3 is a detail sectional view taken as indicated by line 3—3 of Fig. 2.

Fig. 4 is an elevational diagrammatic view of the wheel suspension and steering mechanism of Fig. 1.

Fig. 5 is a front elevational view of a modified type of motor vehicle front wheel suspension and steering mechanism.

Fig. 6 is a sectional plan view along line 6—6 of Fig. 5.

Figure 7:
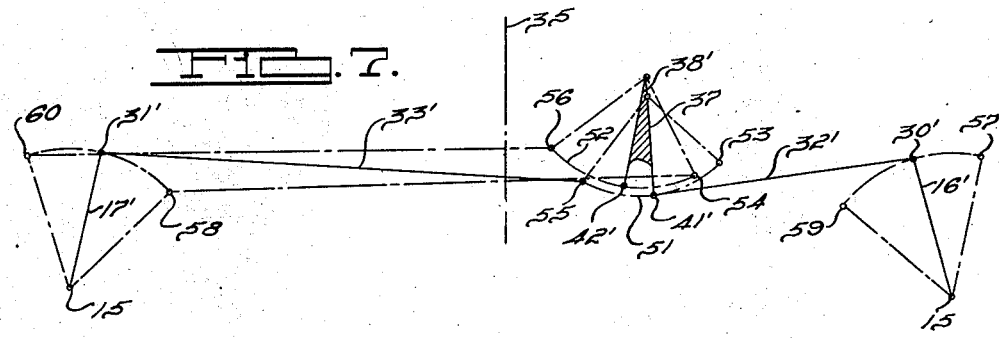
Fig. 7 is a diagrammatic plan view of the Fig. 5 steering mechanism.

In the drawings I have illustrated my improved steering mechanism in conjunction with a leaf spring type of independent wheel suspension in Figs. 1 to 4, and in conjunction with a rigid link type of wheel suspension in Figs. 5 to 8, Fig. 9, and Figs. 10 to 12, it being understood that these types of suspension may be further varied within keeping of the principles of my invention.

Referring particularly to Figs. 1 to 4, reference character 10 represents the vehicle frame side rails and 11 a front cross member therefor. The dirigible front supporting ground wheels 12, 13 are each rotatably mounted on a steering knuckle spindle 14 swivelled about king pin 15 and having rearwardly extending steering knuckle arms 16, 17 respectively associated with wheels 12 and 13.

Each king pin is carried by a knuckle bracket arm 18 guided through upper and lower pivot pins 19, 20 by upper and lower linkages 21 and 22. The upper linkage 21 is illustrated in the form of a rigid link having inwardly diverged arm portions pivotally supported at 23 by the frame preferably through the intermediary of hydraulic shock absorber 24 according to well known practice. The lower linkage 22 comprises a pair of longitudinally spaced leaf spring assemblies which may extend across the front of the vehicle and rigidly secured mid-way thereof to cross member 11 as by bolts 25 acting in conjunction with plates 26, 27. The leaf springs are maintained separated by side flanges 28 of the cross member and ribs 29 of plate 26. The linkages 19, 20 guide vertical displacements of wheels 12 and 13, the ground contacting area of the wheel tire tread rising and falling without objectionable scuffing owing to linkage 22 having a longer length than linkage 21.

Steering arms 16, 17 have terminal articulated ball pivots 30, 31 with tie rods 32, 33 respectively. The usual steering wheel (not shown) operates shaft 34 conveniently positioned to one side of the vehicle, the longitudinal vertical mid-plane thereof being designated at 35. Shaft 34 operates the usual reduction gearing at 36 to swing pitman arm 37 about pivot 38.

The force transmitting end of the pitman arm is forked at 39, 40 to provide spaced articulated ball pivots 41, 42 respectively for the relatively short tie rod 32 and long tie rod 33.

Referring particularly to Fig. 4, I have illustrated diagrammatically the suspension linkages together with positions of the linkages in construction lines for the extreme upper and lower wheel movements. It will be apparent that the movement of pivots 30, 31 and any point on arms 18 is a function of the travel of pivots 19 and 20 guided by linkages 21, 22. Undesired steering movements will occur, when the wheels rise and fall with the vehicle travelling straight ahead, whenever the arcs of movement of pivots 30, 31 as determined by the wheel suspensions deviate appreciably from the arcs of movement of pivots 30, 31 about the relatively fixed pivots 41, 42 for tie rods 32, 33 respectively. With pivots 30, 31 and 41, 42 positioned according to prior art practice, such deviation is so great that the wheels are subjected to lateral swinging on their king pins as they rise and fall, such swinging being of an objectionable magnitude even for wheel displacements well within the normal range of movement of the suspension linkages.

Figure 9:
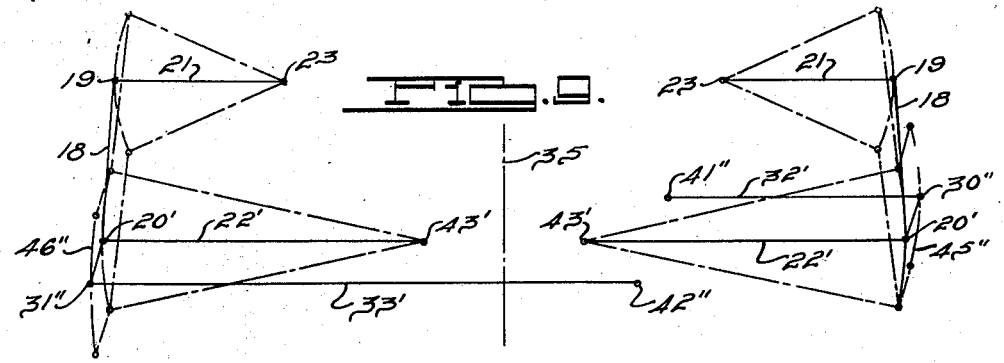
Fig. 9 is a diagrammatic elevational view of a suspension system similar to Fig. 8 but illustrating a further slightly modified arrangement of steering mechanism in association therewith.

My invention, in part, includes spacing pivots 41, 42 vertically, the lower pivot 42 being provided for longer tie rod 33. Furthermore, to more clearly eliminate such wheel steering on vertical wheel displacements, I have further elevated pivots 30, 31 over their conventional locations, pivot 31 being higher than pivot 30. If pivots 41, 42 are vertically spaced still further, for the approximate relationships of parts illustrated, the arcs of pivots 30, 31 under the influences of the tie rods and suspension linkages may be made to exactly agree as illustrated in Fig. 9. This requires five or six inches of spacing in average ordinary installations and usually interferes with other parts of the vehicle as pitman arm 37 swings for normal wheel steering. Thus, I have effected a slight compromise which however so closely approximates theoretically ideal conditions that in practice pivots 41, 42 need only be separated vertically from approximately one to three inches, more or less separation giving results which are not generally important.

Furthermore, by employing a linkage 22 of leaf spring type, the effective pivot of the spring is different for upward and downward displacements of the wheels from the normal wheel positions. This difference arises from the spring levers separating or acting together as a wheel moves down or up. Thus, the effective arc of frame pivotal support for a spring linkage 22 is shorter for upward wheel movements than for lower wheel movements. In one typical embodiment of my invention I have employed, by way of example, a spring linkage of twenty-two inches length from pivot 20 to central plane 35. This has resulted, with a spring anchorage by bolts 25, in an arc of upward swing of pivots 30, 31 on a radius of about fourteen inches about pivot 43 and a lower arc on a radius of nearly eighteen inches about pivot 44. I prefer to locate points 30, 31 and 41, 42 to favor the upper arc since the wheel is loaded by the vehicle to a much greater extent when the frame falls relatively to a wheel than when the wheel falls relative to the frame. In other words, in effecting a slight compromise, pivots 30, 31 swing more nearly in an arc having centers at 41, 42 respectively (which arc is the natural arc determined by the wheel linkage) when the wheel is displaced upwardly, than when the wheel is displaced downwardly. In any event deviations in either direction are not of objectionable magnitude by reason of my invention and normal wheel displacements (less than to extreme limits) do not result in any appreciable lateral wheel displacements of steering tendency.

In Fig. 4 arcs 45, 46 represent the travel of pivots 30, 31 respectively under the influence of the suspension linkage, while arcs 47, 48 represent corresponding travel of pivots 30, 31 about pivots 41, 42 of the tie rods.

Referring now to Figs. 5 to 8, I have illustrated a generally similar arrangement of suspension linkage and frame as indicated by similar reference characters. Corresponding parts for the tie rods and parts connected thereto, as well as the lower rigid link, are indicated by primed numerals which correspond in function and operation to similar unprimed numerals for parts aforesaid.

In addition, a coil spring 49 is associated with each wheel suspension acting to support the frame between upper seat 50 and lower seat 51 on lower linkage 21', this coil spring taking the place of the yielding support provided by the spring linkage 22 of Fig. 1.

Figure 8:
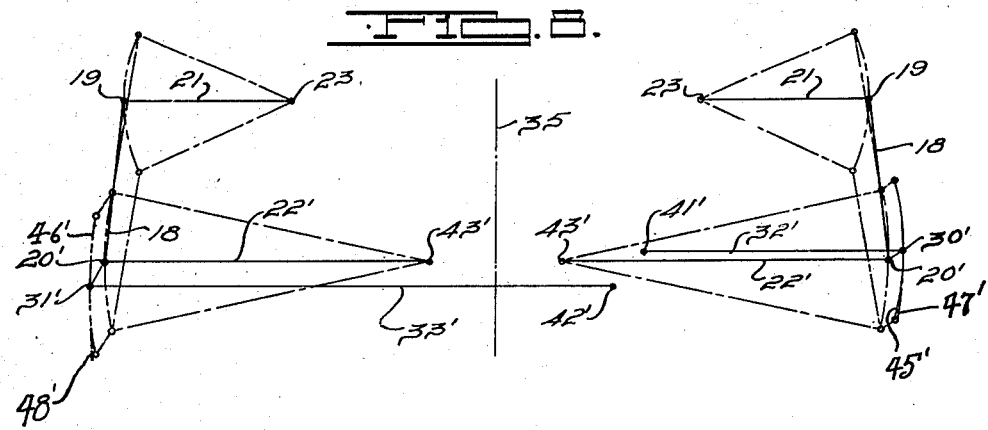
Fig. 8 is a diagrammatic elevational view of the Fig. 5 wheel suspension and steering mechanism.

In Figs. 7 and 8, the pitman arm 37' pivots about an inclined axis 38' and is forked to provide spaced ball pivots 41' and 42' which describe arcs 52 and 53 respectively, these arcs being longitudinally spaced when viewed in plan. The limiting positions of steering movement of pivots 41' and 42' for steering to the right are respectively designated at 53, 54 while the opposite direction limits are at 55, 56 respectively, from which it will be noted that arcs 52, 53 overlap circumferentially with respect to axis 38' as a center of swing of ball pivots 41' and 42'. This arrangement provides improved steering of the wheels whereby the wheels have a differential of steering movement to compensate for their relatively varying distance from any center of turning movement. This is indicated by the extreme positions of steering for ball pivots 30' and 31' during extreme right and left turns. For extreme right turns pivots 30', 31' respectively move to 57, 58 while left turns move these pivots to 59, 60 respectively.

In Fig. 8 ball pivots 30', 31' describe arcs 45', 46' respectively, due to the suspension linkage 21, 18, 22' while these pivots tend to move in arcs 47', 48' about the tie rod pitman arm pivots 41', 42' respectively. Obviously the error or deviation in these arcs is extremely small, by reason of my invention. The pivots 30', 41' both lie above the level of the associated lower linkage 22' while pivots 31', 42' lie below their associated lower linkage 22' in this embodiment of my invention. It will be apparent that some further variations in the spacing of pivots 41', 42' may be desired and in different installations the ratios of the various linkage parts will often require further changes in the illustrated relationships but from my disclosure of the principles involved it is possible to easily adapt my invention to any type of suspension.

Referring particularly to Fig. 6, I have illustrated another of my improvements in the steering mechanism wherein the pitman arm balls 41', 42' are illustrated as lying forwardly of a transverse line $b$ passing through the steering arm pivots 30', 31', it being customary heretofore to locate the tie rod or rods along such line. By locating the pivots 41', 42' ahead of line $b$ I prevent an undesirable loss in the overall steering ratio especially to any appreciable extent within the major part of the swing of pitman arm 37' from its normal position for straight ahead vehicle travel. Ordinarily such loss is appreciable to an undesirable extent just as soon as any steering takes place because initially the effective lengths of the steering arms are greatest or substantially so with the pitman arm in the normal position, any steering movements heretofore progressively lessening the effective steering arm lengths as these arms are swung about their king pins and as the angles of the tie rods change. With my construction, the maximum effective length of the steering arms 16', 17' is not realized at the initial position of pitman arm 37' but gradually approaches this maximum and gradually recedes therefrom as steering movement of the pitman arm takes place resulting in a wide range of pitman arm swing with substantially constant overall steering gear ratio.

Thus in Fig. 6 I have illustrated a typical condition at wheel 12. Normally tie rod 32' for example lies along line $c$ between pivots 30', 41', resulting in an effective length of arm 16' as shown at $d$, somewhat less than the actual maximum effective length of arm 16' represented at $e$. As pitman arm 37' swings to the dotted position, tie rod 32' moves to axis $c'$ resulting in an effective lever arm $d'$ for arm 16'. During the greater part of this movement the effective length of arm 16' will remain close to a constant value. The same advantageous condition is realized at the wheel 13 steered by tie rod 33'.

In Fig. 9 I have illustrated a wheel suspension as in Fig. 8 with the pitman arm ball pivots 41'', 42'' forked the maximum amount to provide coincidence of the arcs 45', 47' and 46', 48' of Fig. 8, the steering knuckle arm pivots 30'', 31'' being located to permit this coincidence. Thus in Fig. 9 there is no wheel fight to any degree even at the extreme movements of the pivots 30'', 31'' in moving along arcs 45'', 46''. The more nearly ball pivot 30' in Fig. 8 approaches the position of pivot 30'' of Fig. 9, for the normal positions thereof, the more nearly do arcs 45', 47' coincide, pivot 41' being at the same time moved to 41''. In Fig. 9 further reference characters are the same as in Fig. 8 since their functions are similar.

Throughout the several embodiments of my invention the pitman arm is illustrated as being forked, as at 39, 40 in Fig. 1, to provide the spaced tie rod ball pivots as this forking facilitates the manufacture and assembly of the steering mechanism.

Figure 10:
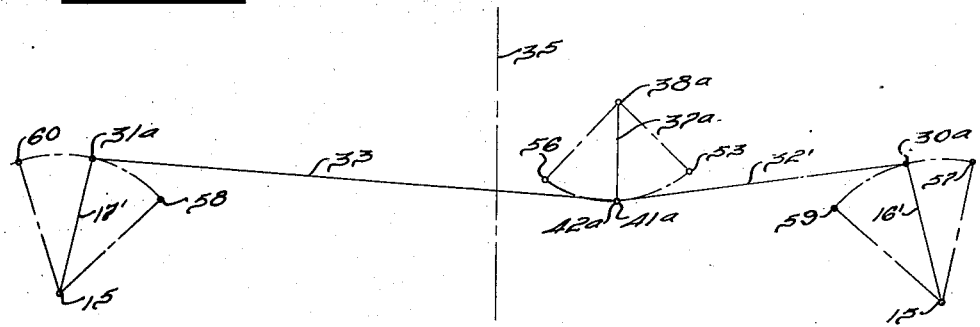
Fig. 10 is a diagrammatic plan view of a steering mechanism like Fig. 7 but illustrating a further modified construction.
Figure 11:
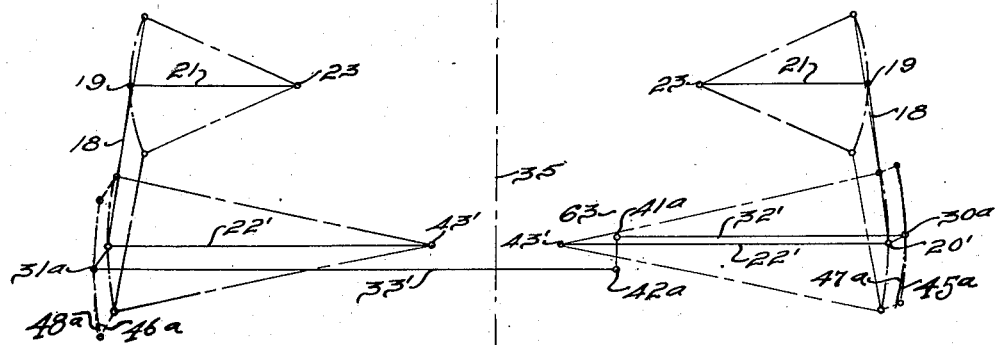
Fig. 11 is a diagrammatic elevational view of my wheel suspension incorporating the Fig. 10 steering mechanism.
Figure 12:
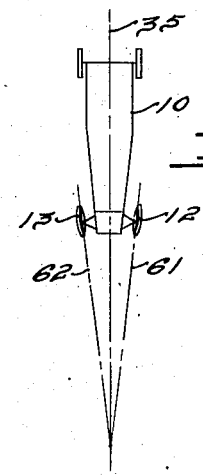
Fig. 12 is a diagrammatic plan view of the motor vehicle.

Referring now to the form of my invention illustrated in Figs. 10 to 12, I have provided a steering mechanism in conjunction with my wheel suspension for eliminating undesirable change in the toe-in of the steering wheels as the wheels are moved to the right or left. The desirability of toe-in is generally well-known in the art and in Fig. 12 I have illustrated the front wheels 12, 13 inclined, in addition to their usual caster and camber settings, forwardly toward each other as represented in greatly exaggerated form by the converging wheel planes 61, 62. Where the pitman arm forked tie rod ball pivots are laterally separated, as in the foregoing embodiments of my invention, the steering geometry while greatly improved is subject to a criticism applicable to many other forms of steering devices. This resides in the fact that when the pitman arm swings to the right or left, the distance between the pitman arm balls becomes less when measured laterally of the car. This has the effect of bringing the pitman arm ball points together as the pitman arm swings. The actual relative position of the pitman arm balls does not of course change, but measured laterally this ball separation diminishes in proportion to the swing of the pitman arm to the right or left. Now, it is desirable to provide the front wheels with a normal toe-in as illustrated in exaggerated form in Fig. 12 where the wheels are straight forward.

When steering takes place, the effect of the aforesaid foreshortening of the distance between the pitman arm balls is to bring the ball points together which obviously changes the relative toe-in of the wheels during steering. This introduces an error in the steering, undue wear at the wheel tread, tire squeal, and other undesired characteristics. Furthermore, this error at the pitman arm balls is multiplied by the ratio of the steering knuckle arm length and the rolling radius of the wheel and tire.

In Figs. 10 and 11, the pitman arm 37$^a$ pivots about axis 38$^a$ so that the ball pivots 41$^a$, 42$^a$ are vertically spaced on axis 63 parallel to axis 38, without lateral spacing of the ball pivots. If desired the axis 38$^a$ may be inclined. In any event, pivots 41$^a$, 42$^a$ preferably lie in a plane parallel to mid-plane 35 during at least one position of swinging movement of pitman arm 37$^a$. It will be apparent that swing of the pitman arm to the dotted positions of Fig. 10 will not alter the relative positions of the inner ends of the tie rods laterally of the vehicle and the relative toe-in of the wheels will be preserved during steering.

In Fig. 11, the vertical spacing of pivots 41$^a$, 42$^a$ and their relationships with the outer tie rods pivots 30$^a$, 31$^a$ is preferably such that wheel fight is substantially eliminated according to the other embodiments of my invention. Such relationship is illustrated by the pairs of arcs 45ª, 47ª and 46ª, 48ª which respectively correspond to pairs of arcs 45, 47 and 46, 48 of Fig. 4; and 45', 47' and 46' and 48' of Fig. 8. Other reference characters in Figs. 10 and 11 are the same as in Figs. 7 and 8 since the parts may be of similar structure and operation.

What I claim is:

1. In a motor vehicle, the combination with a vehicle frame structure, of a pair of steerable road wheels disposed adjacent one end of the frame at opposite sides thereof, means supporting each of said wheels on said frame for rising and falling movements with respect to said frame independently of the other wheel, said means including linkage intermediate the frame and each of said wheels for guiding said wheel movements and a steering knuckle swivelly connecting each of said wheels to its said linkage, tie rods articulated at one of their ends respectively to said steering knuckles, steering gear disposed to one side of the longitudinal vertical mid-plane of the vehicle, means for articulating the other ends of said tie rods to said steering gear for pivotal movement relative thereto during said wheel movements, one of said tie rods being of substantially greater length than the other, the points of articulation of said tie rods to said steering gear being relatively vertically spaced and so constructed and arranged that tendency of said steering knuckles to swivel during said wheel movements is substantially prevented when the vehicle is travelling approximately straight ahead.

2. In a motor vehicle, the combination with a vehicle frame structure, of a pair of steerable road wheels disposed adjacent one end of the frame at opposite sides thereof, means supporting each of said wheels on said frame for rising and falling movements with respect to said frame independently of the other wheel, said means including linkage intermediate the frame and each of said wheels for guiding said wheel movements and a steering knuckle swivelly connecting each of said wheels to its said linkage, tie rods articulated at one of their ends respectively to said steering knuckles, steering gear disposed to one side of the longitudinal vertical mid-plane of the vehicle, said steering gear including a steering gear arm, and means for articulating the other ends of said tie rods to one end of said steering gear arm at relatively vertically spaced points located approximately at the respective centers of arcuate paths of movement of the points of said articulation of the tie rods to the steering knuckles during said wheel movements when the vehicle is travelling approximately straight forward.

3. In a motor vehicle, the combination with a vehicle frame structure, of a pair of steerable road wheels disposed adjacent one end of the frame at opposite sides thereof, means supporting each of said wheels on said frame for rising and falling movements with respect to said frame independently of the other wheel, said means including linkage intermediate the frame and each of said wheels for guiding said wheel movements and a steering knuckle swivelly connecting each of said wheels to its said linkage, tie rods articulated at one of their ends respectively to said steering knuckles, steering gear disposed to one side of the longitudinal vertical mid-plane of the vehicle, said steering gear including a swinging pitman arm having a forked steering force transmitting end, the forked portions of said pitman arms being relatively vertically disposed, and means for articulating the other ends of said tie rods to said forked portions respectively.

4. In a motor vehicle, the combination with a vehicle frame structure, of a pair of steerable road wheels disposed adjacent one end of the frame at opposite sides thereof, means supporting each of said wheels on said frame for rising and falling movements with respect to said frame independently of the other wheel, said means including linkage intermediate the frame and each of said wheels for guiding said wheel movements and a steering knuckle swivelly connecting each of said wheels to its said linkage, tie rods articulated at one of their ends respectively to said steering knuckles, steering gear disposed to one side of the longitudinal vertical mid-plane of the vehicle, means for articulating the other ends of said tie rods to said steering gear for pivotal movement relative thereto during said wheel movements, one of said tie rods being of substantially greater length than the other, the points of articulation of said tie rods to said steering gear being relatively vertically and laterally spaced and so constructed and arranged that tendency of said steering knuckles to swivel during said wheel movements is substantially prevented when the vehicle is travelling approximately straight ahead.

5. In a motor vehicle, the combination with a vehicle frame structure, of a pair of steerable road wheels disposed adjacent one end of the frame at opposite sides thereof, means supporting each of said wheels on said frame for rising and falling movements with respect to said frame independently of the other wheel, said means including linkage intermediate the frame and each of said wheels for guiding said wheel movements and a steering knuckle swivelly connecting each of said wheels to its said linkage, tie rods articulated at one of their ends respectively to said steering knuckles, steering gear disposed to one side of the longitudinal vertical mid-plane of the vehicle, said steering gear including a steering gear arm, and means for articulating the other ends of said tie rods to one end of said steering gear arm at relatively vertically and laterally spaced points located approximately at the respective centers of arcuate paths of movement of the points of said articulation of the tie rods to the steering knuckles during said wheel movements when the vehicle is travelling approximately straight ahead.

6. In a motor vehicle, a pair of dirigible ground wheels at the forward end of the vehicle adjacent opposite sides thereof respectively, means for pivotally supporting each of said wheels for steering movements and including a rearwardly extending steering knuckle arm for each wheel, a laterally swinging steering movement imparting member, and a tie rod articulated between each of said steering arms and said swinging member, the points of articulation of said tie rods with said swinging member being disposed substantially forwardly of a vertical transverse plane passing through the points of articulation of said tie rods with said steering arms, lines between the points of articulation of each of said tie rods respectively defining an obtuse angle with lines perpendicular with the axes of wheel pivoting and passing through the associated points of articulation of said steering arms with said tie rods, when said swinging member is positioned for straight ahead vehicle travel.

7. In a motor vehicle, the combination with a vehicle frame structure, of a pair of steerable road wheels disposed adjacent one end of the frame at opposite sides thereof, means supporting each of said wheels on said frame for rising and falling movements with respect to said frame independently of the other wheel, said means including linkage intermediate the frame and each of said wheels for guiding said wheel movements and a steering knuckle swivelly connecting each of said wheels to its said linkage, tie rods articulated at one of their ends respectively to said steering knuckles, steering gear disposed to one side of the longitudinal vertical mid-plane of the vehicle, means for articulating the other ends of said tie rods to said steering gear for pivotal movement relative thereto during said wheel movements, one of said tie rods being of substantially greater length than the other, the points of articulation of said tie rods to said steering gear being relatively vertically spaced and so constructed and arranged that tendency of said steering knuckles to swivel during said wheel movements is substantially prevented when the vehicle is travelling approximately straight ahead, the point of articulation of the longer tie rod with said steering gear being disposed at a lower elevation than the corresponding point of articulation of the shorter tie rod.

8. In a motor vehicle, the combination with a vehicle frame structure, of a pair of steerable road wheels disposed adjacent one end of the frame at opposite sides thereof, means supporting each of said wheels on said frame for rising and falling movements with respect to said frame independently of the other wheel, said means including linkage intermediate the frame and each of said wheels for guiding said wheel movements and a steering knuckle swivelly connecting each of said wheels to its said linkage, tie rods articulated at one of their ends respectively to said steering knuckles, steering gear disposed to one side of the longitudinal vertical mid-plane of the vehicle, said steering gear including a steering gear arm, and means for articulating the other ends of said tie rods to one end of said steering gear arm at relatively vertically spaced points located approximately at the respective centers of arcuate paths of movement of the points of said articulation of the tie rods to the steering knuckles during said wheel movements when the vehicle is travelling approximately straight forward, the point of articulation of the longer tie rod with said steering gear arm being disposed at a lower elevation than the corresponding point of articulation of the shorter tie rod.

9. In a motor vehicle, the combination with a vehicle frame structure, of a pair of steerable road wheels disposed adjacent one end of the frame at opposite sides thereof, means supporting each of said wheels on said frame for rising and falling movements with respect to said frame independently of the other wheel, said means including linkage intermediate the frame and each of said wheels for guiding said wheel movements and a steering knuckle swivelly connecting each of said wheels to its said linkage, tie rods articulated at one of their ends respectively to said steering knuckles, steering gear disposed to one side of the longitudinal vertical mid-plane of the vehicle, said steering gear including a swinging pitman arm having a forked steering force transmitting end, the forked portions of said pitman arm being relatively vertically disposed, and means for articulating the other ends of said tie rods to said forked portions respectively, the point of articulation of the longer tie rod with said pitman arm being disposed at a lower elevation than the corresponding point of articulation of the shorter tie rod.

10. In a motor vehicle, the combination with a vehicle frame structure, of a pair of steerable road wheels disposed adjacent one end of the frame at opposite sides thereof, means supporting each of said wheels on said frame for rising and falling movements with respect to said frame independently of the other wheel, said means including linkage intermediate the frame and each of said wheels for guiding said wheel movements and a steering knuckle swivelly connecting each of said wheels to its said linkage, tie rods articulated at one of their ends respectively to said steering knuckles, steering gear disposed to one side of the longitudinal vertical mid-plane of the vehicle, means for articulating the other ends of said tie rods to said steering gear for pivotal movement relative thereto during said wheel movements, one of said tie rods being of substantially greater length than the other, the points of articulation of said tie rods to said steering gear being relatively vertically and longitudinally spaced and so constructed and arranged that tendency of said steering knuckles to swivel during said wheel movements is substantially prevented when the vehicle is travelling approximately straight ahead.

11. In a motor vehicle, the combination with a vehicle frame structure, of a pair of steerable road wheels disposed adjacent one end of the frame at opposite sides thereof, means supporting each of said wheels on said frame for rising and falling movements with respect to said frame independently of the other wheel, said means including linkage intermediate the frame and each of said wheels for guiding said wheel movements and a steering knuckle swivelly connecting each of said wheels to its said linkage, tie rods articulated at one of their ends respectively to said steering knuckles, steering gear disposed to one side of the longitudinal vertical mid-plane of the vehicle, means for articulating the other ends of said tie rods to said steering gear for pivotal movement relative thereto during said wheel movements, one of said tie rods being of substantially greater length than the other, the points of articulation of said tie rods to said steering gear being relatively vertically, laterally and longitudinally spaced and so constructed and arranged that tendency of said steering knuckles to swivel during said wheel movements is substantially prevented when the vehicle is travelling approximately straight ahead.

12. In a motor vehicle, the combination with a vehicle frame structure, of a pair of steerable road wheels disposed adjacent one end of the frame at opposite sides thereof, means supporting each of said wheels on said frame for rising and falling movements with respect to said frame independently of the other wheel, said means including linkage intermediate the frame and each of said wheels for guiding said wheel movements and a steering knuckle swivelly connecting each of said wheels to its said linkage, tie rods articulated at one of their ends respectively to said steering knuckles, steering gear disposed to one side of the longitudinal vertical mid-plane of the vehicle, means for articulating the other ends of said tie rods to said steering gear for pivotal movement relative thereto during said wheel movements, one of said tie rods being of substantially greater length than the other, the points of articulation of said tie rods to said steering gear being relatively vertically spaced and so constructed and arranged that tendency of said steering knuckles to swivel during said wheel movements is substantially prevented when the vehicle is travelling approximately straight ahead, said tie rod points of articulation to said steering gear being substantially aligned longitudinally of the vehicle for at least one of their positions of movement by said steering gear.

13. In a motor vehicle, the combination with a vehicle frame structure, of a pair of steerable road wheels disposed adjacent one end of the frame at opposite sides thereof, means supporting each of said wheels on said frame for rising and falling movements with respect to said frame independently of the other wheel, said means comprising a pair of upper and lower linkages movably supported by said frame and positioned at each side of the vehicle, a knuckle supporting arm pivotally connecting each of said pairs of linkages, one of the linkages of each pair comprising a spring assembly adapted to move the pivot thereof with said supporting arm in relatively different arcs as the wheel associated therewith moves upwardly and downwardly from its normal position, a steering knuckle arm for each of said wheels and adapted for rising and falling movements therewith, tie rod means articulated to said knuckle arms, steering movement imparting means articulated to said tie rod means, the points of articulation being relatively vertically spaced and so constructed and arranged that tendency of said wheels to steer is substantially prevented when the vehicle is travelling approximately straight ahead during said rising and falling wheel movements.

14. In a motor vehicle, the combination with a vehicle frame structure, of a pair of steerable road wheels disposed adjacent one end of the frame at opposite sides thereof, means supporting each of said wheels on said frame for rising and falling movements with respect to said frame independently of the other wheel, said means comprising a pair of upper and lower linkages movably supported by said frame and positioned at each side of the vehicle, a knuckle supporting arm pivotally connecting each of said pairs of linkages, one of the linkages of each pair comprising a spring assembly adapted to move the pivot thereof with said supporting arm in relatively different arcs as the wheel associated thereof moves upwardly and downwardly from its normal position, a steering knuckle arm for each of said wheels and adapted for rising and falling movements therewith, tie rod means articulated to said knuckle arms, steering movement imparting means articulated to said tie rod means, the last named points of articulation being relatively vertically spaced and so constructed and arranged relative to the first named points of articulation that tendency of said wheels to steer is substantially prevented when the vehicle is travelling approximately straight ahead and during said rising wheel movements to a greater extent than during said falling wheel movements.

15. In a motor vehicle having a frame, dirigible ground wheels each having a steering knuckle providing a swivel mounting therefor, means intermediate the frame and each of said steering knuckles for supporting the frame and providing rising and falling movements of each wheel independently of the other, steering gear including a swinging pitman arm, a tie rod between said pitman arm and each of said steering knuckles, means providing universal pivoting connections relatively between said tie rods and said steering knuckles and pitman arm, the pivoting connections of said tie rods to said pitman arm being relatively vertically spaced.

16. In a motor vehicle having a frame, dirigible ground wheels each having a steering knuckle providing a swivel mounting therefor, means intermediate the frame and each of said steering knuckles for supporting the frame and providing rising and falling movements of each wheel independently of the other, steering gear including a swinging pitman arm, a tie rod between said pitman arm and each of said steering knuckles, means providing universal pivoting connections relatively between said tie rods and said steering knuckles and pitman arm, the pivoting connections of said tie rods to said pitman arm being relatively vertically spaced and lying substantially in a plane, parallel to the longitudinal vertical mid-plane of the vehicle, for at least one position of movement of said pivoting connections.

17. In a motor vehicle having a frame, dirigible ground wheels each having a steering knuckle providing a swivel mounting therefor, means intermediate the frame and each of said steering knuckles for supporting the frame and providing rising and falling movements of each wheel independently of the other, steering gear including a swinging pitman arm, a tie rod between said pitman arm and each of said steering knuckles, means providing universal pivoting connections relatively between said tie rods and said steering knuckles and pitman arm, the pivoting connections of said tie rods to said pitman arm being relatively vertically spaced, said pivoting connections being so constructed and arranged that tendency of said steering knuckles to swivel during said wheel movements is substantially prevented when the vehicle is travelling approximately straight ahead.

18. In a motor vehicle having a frame structure, a pair of steerable ground wheels, means for supporting and guiding each of said wheels from said frame structure for independent rising and falling movements, said means including a supporting member for swivelling each of said wheels about an axis of steering movement, each of said supporting members having a steering arm, and tie rod means articulated to said steering arms for swinging said steering arms about said axes respectively, said tie rod means and said steering arms being normally relatively angularly disposed to successively increase and then decrease the effective length of said steering arms when said tie rod means operates to move said wheels from their normal positions to steering positions, said tie rod means comprising a pair of tie rods of unequal lengths, and a swinging pitman arm articulated to the inner ends of said tie rods.

19. In a motor vehicle having a frame structure, a pair of steerable ground wheels, means for supporting and guiding each of said wheels relative to the frame structure for independent rising and falling movements, said supporting and guiding means providing an axis of steering movement for each of said wheels, tie rods of unequal lengths respectively articulated at their outer ends to the supporting means for each of said wheels for swinging said wheels about said axes respectively, and a steering member articulated to the inner ends of said tie rods at points of relatively different elevations located approximately at the centers of arcs respectively defined by movement of the outer ends of the tie rods during said rising and falling wheel movements, for minimizing undesired wheel steering movements.

20. A motor vehicle according to claim 19, in which the longer of said unequal length tie rods has its point of inner end articulation disposed at a lower elevation than the corresponding point of articulation of the shorter tie rod.

21. A motor vehicle according to claim 19, in which the longer of said tie rods has its points of articulation disposed at lower elevations than the corresponding points of articulation of the shorter tie rod.

22. A motor vehicle according to claim 19, in which the longer of said tie rods has its point of outer end articulation disposed at a lower elevation than the corresponding point of articulation of the shorter tie rod.

23. In a motor vehicle having a frame structure, a pair of steerable ground wheels, means for supporting and guiding each of said wheels relative to the frame structure for independent rising and falling movements, said supporting and guiding means providing an axis of steering movement for each of said wheels, tie rods of unequal lengths respectively articulated at their outer ends to the supporting means for each of said wheels for swinging said wheels about said axes respectively, and a steering member articulated to the inner ends of said tie rods at points located approximately at the centers of arcs respectively defined by movement of the outer ends of the tie rods during said rising and falling wheel movements, for minimizing undesired wheel steering movements, the longer of said tie rods having its point of outer end articulation disposed at a lower elevation than the corresponding point of articulation of the shorter tie rod.

24. In a motor vehicle, the combination with a vehicle frame structure, of a pair of steerable road wheels disposed adjacent one end of the frame at opposite sides thereof, means supporting each of said wheels on said frame for rising and falling movements with respect to said frame independently of the other wheel, said means including linkage intermediate the frame and each of said wheels for guiding said wheel movements and a steering knuckle swivelly connecting each of said wheels to its said linkage, tie rods articulated at one of their ends respectively to said steering knuckles, steering gear disposed to one side of the longitudinal vertical mid-plane of the vehicle, means for articulating the other ends of said tie rods to said steering gear for pivotal movement relative thereto during said wheel movements, one of said tie rods being of substantially greater length than the other, the points of articulation of said tie rods to said steering gear being relatively laterally and longitudinally spaced and so constructed and arranged that tendency of said steering knuckles to swivel during said wheel movements is substantially prevented when the vehicle is travelling approximately straight ahead.

THOMAS E. M. WHEAT.